United States Patent Office 3,524,927
Patented Aug. 18, 1970

3,524,927
ELECTRONIC AID FOR PRODUCING VISUAL CONTOUR
Clyde E. Le Fevre, North Hollywood, Clarence R. Linsley, La Crescenta, Phil M. Salomon, Sunland, and Melvin I. Smokler, Van Nuys, Calif., assignors to Singer-General Precision, Inc., a corporation of Delaware
Filed Jan. 15, 1964, Ser. No. 337,939
Int. Cl. H04n 7/18
U.S. Cl. 178—6.8                 13 Claims

ABSTRACT OF THE DISCLOSURE

A contour plotting apparatus in which a stereo contour model projected against the screen of a first CRT is traced by the cathode ray beam which is manually controlled by a joy stick control which, when released, will not affect the last position of the cathode ray beam. A second CRT operating in synchronism with the first CRT reproduces the cathode ray tracing of the first CRT and is photographed to produce a permanent record.

---

The present invention relates to a new and improved apparatus for the production of topographic maps of the type that exhibit contour lines which represent points of equal altitude. Maps of this type are usually made from stereoscopically related photographs, i.e., photographs of the same terrain taken from different points. In practice these photographs are usually taken from airplanes. When two such photographs are projected upon a suitable base in different colors or with differently polarized light, from different points corresponding to the different points at which they were taken in nature, and the overlapping areas of the two projections are viewed from above by an observer using spectacles whose individual glasses are differently tinted or differently polarized in a manner corresponding to the color or polarization of the projections, the observer appears to see a three-dimensional reproduction of the particular terrain. This is known as a stereo model.

In practice it is difficult to photograph an area from two different points of equal elevation under exactly the same conditions. Therefore, when projecting a pair of stereoscopically related photographs with differently colored or differently polarized light upon a common base, it is first necessary to properly align the corresponding areas of the two projections with the aid of points of orientation that appear in both pictures and which may either be clearly discernible landmarks, such as rocks, houses, roads, and the like, or artificially created marks that were provided in the area under observation prior to taking the photographs.

When proper alignment of the corresponding areas of the two projections has been established and a true stereo model of the terrain may thus be created in the observer's mind, it is possible for the observer to recognize points of equal altitude at any selected level and mark these points in the form of continuous contour lines upon a sheet of paper that may have been placed upon the base onto which the two aligned images are projected. To facilitate this operation, the observer usually employs a small platform or table of adjustable height which contains in its center a minute opening that is illuminated from below. This opening appears as a point of light to the observer and as the observer moves the platform across the projection base over areas representing a sloping surface, said point of light appears to lie clearly either above, be clearly in contact with, or to lie clearly below the surface of the stereo model depending on whether the horizontal plane represented by the elevated surface of the platform is higher, of equal height, or lower than the surface of the stereo model at the center point of the platform. Hence, by observing the point of light created by the center opening of the platform in its relation to the surface of the stereo model, cautiously moving said platform over the projection base in such a manner that said point of light appears to remain in contact with the surface of the stereo model, and guiding a stylus vertically below the center opening of the platform over a sheet of paper secured to the projection base, the observer may draw a contour line containing all points of an altitude corresponding to the altitude represented by the particular vertical adjustment of the platform; and by repeating the process upon readjustment of the platform to different levels, a craftsman may draw a complete topographic map of the terrain under observation, which has contour lines that represent selected altitude levels. The precise altitude of said contour lines can readily be determined by comparison with points of the stereo model whose actual altitude is known, and, in fact, the adjusting means of the platform may be provided with calibrations from which the altitude of the contour line plotted at each particular level of adjustment of the platform may be read directly.

It is an object of the invention to facilitate the task of contour plotting.

More specifically, it is an object of the invention to provide a contour plotting apparatus, wherein a point of light may readily be moved along predetermined contours of a stereo model without the necessity of moving a platform or table of the type described.

Another object of the invention is to provide a contour plotting apparatus wherein the desired contour of a stereo model may readily be traced by a point of light and the traces be permanently recorded without the use of a stylus or like drawing utensil, and in fact without movement of any mechanical components aside from the manipulation of a control column.

These and other objects of the present invention will be apparent from the following description of the accompanying drawings which illustrate a preferred embodiment thereof and wherein FIG. 1 is a schematic front elevation partially in section of a contour plotting apparatus embodying the invention;

In accordance with the invention the screen of a cathode ray tube is arranged to serve as the projection base for the stereoscopic projectors of a contour plotting apparatus, and manually operable means are provided to control the position of the point of impingement of the electron beam of said tube upon said screen so that an operator may move the light point produced by impingement of the electron beam upon the screen at will to any position in, and along any desired path over, the total area of said screen. Thus, by scanning the stereo model created upon the screen of the tube, with spectacles having differently tinted or differently polarized glasses and appropriately operating the beam control means, an operator may move the point of light produced by the electron beam along the screen of the tube in contact with the surface of the stereo model at the altitude level corresponding to the effective distance between the diapositives in the projectors and the screen of the tube, and by simultaneously employing the same beam control means to control the position of the electron beam of another cathode ray tube in synchronism with the electron beam of the first tube and photographically recording any traces of light on the screen of said other tube by means of a camera, the desired contour is automatically drawn upon the photosensitive recording medium in the camera, without need for the operator to move a platform and/or stylus; and by changing the effective distance between the diapositives in the projectors and the screen of the scanning tube, i.e., by shifting the position of the stereo model produced by the projector relative to the screen of the scanning tube, the contour for any desired altitude may be traced by the light points on the screens of both said tubes, and may be permanently recorded by the camera associated with the second tube which will be referred to as the "display tube" hereinafter, while the first tube will be referred to as the "scanning tube."

Figure 1:
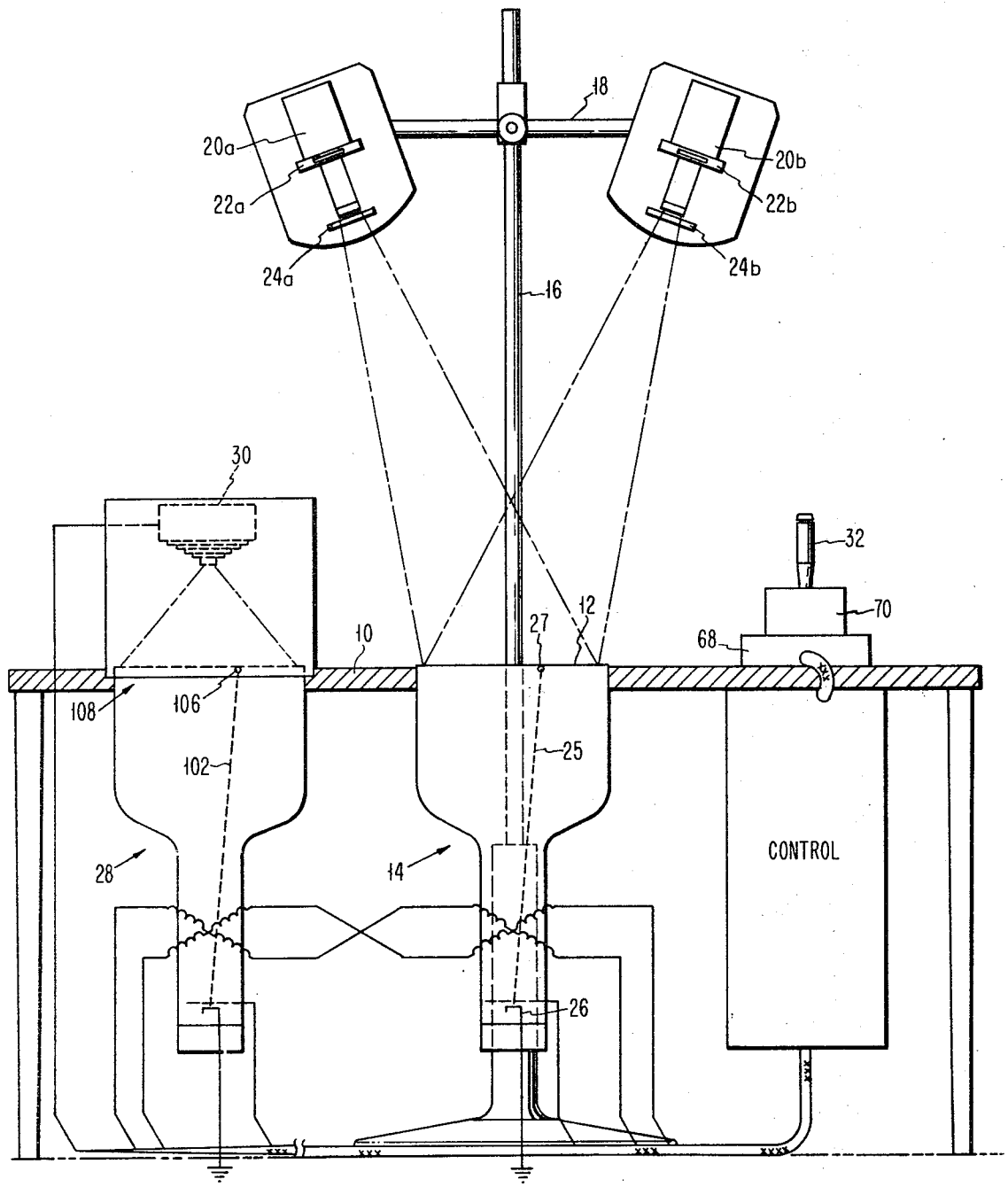

Having first reference to FIG. 1, the reference numeral 10 resignates a table plate which contains the screen 12 of the scanning tube 14. Located behind said tube is a post 16 which supports a yoke or cross bar 18 in a manner permitting adjustment of its height above the table 10. Projectors 20a and 20b are suitably supported from the opposite ends of said cross bar in a manner permitting individual universal adjustment of their positions. For details in the construction of universally adjustable supports permitting proper orientation of stereoscopically related projectors reference is made to U.S. Pat. No. 3,246,560 of Morris Birnbaum et al., issued on Apr. 19, 1966, for an Automatic Contour Plotter, which has been assigned to the same assignee as the present patent application. The two projectors are adjusted to project the images of two stereoscopically related diapositives, 22a and 22b of the same terrain in properly oriented relation through differently colored filters or differently oriented polarizers 24a and 24b, respectively, upon the screen 12 of the scanning tube to produce a stereo model thereon that may be discerned from above by an operator wearing the appropriate spectacles.

When the tube 14 is energized, the electron beam 25 emitted by its cathode 26 produces a minute luminous point 27 upon the screen 12 of said tube. This point may lie above, be in contact with or lie below the surface of the stereo model depending on whether the horizontal plane represented by the screen 12 is higher, of equal height or lower than the surface of the stereo model in the area of the screen where the light point is formed. The present invention provides manually operable means for deflecting the electron beam of the scanning tube 14 in any desired direction; and by appropriately operating said beam deflecting means the operator may shift the point of light on the screen of the scanning tube into contact with the surface of the stereo model and may then move said point along the surface of the stereo model and thus trace luminously a contour of predetermined altitude upon the screen of tube 14 with no more effort and no mechanical movement other than the manipulation of said electron beam deflection control means; and by arranging for said beam deflection control means to control simultaneously the state of deflection of the electron beam of display tube 28 (FIGS. 1 and 2) in synchonism with the electron beam of the scanning tube, it is possible to display the desired contour luminously at a place removed from the stereo model where a camera 30 may be arranged to make a permanent record of the contour, and any additional contours of the same terrain that may be traced with the point of light 27 of the scanning tube upon the stereo model upon readjustment of the vertical distance between the diapositives 22a, 22b and the screen 12 of the scanning tube.

Figure 2:
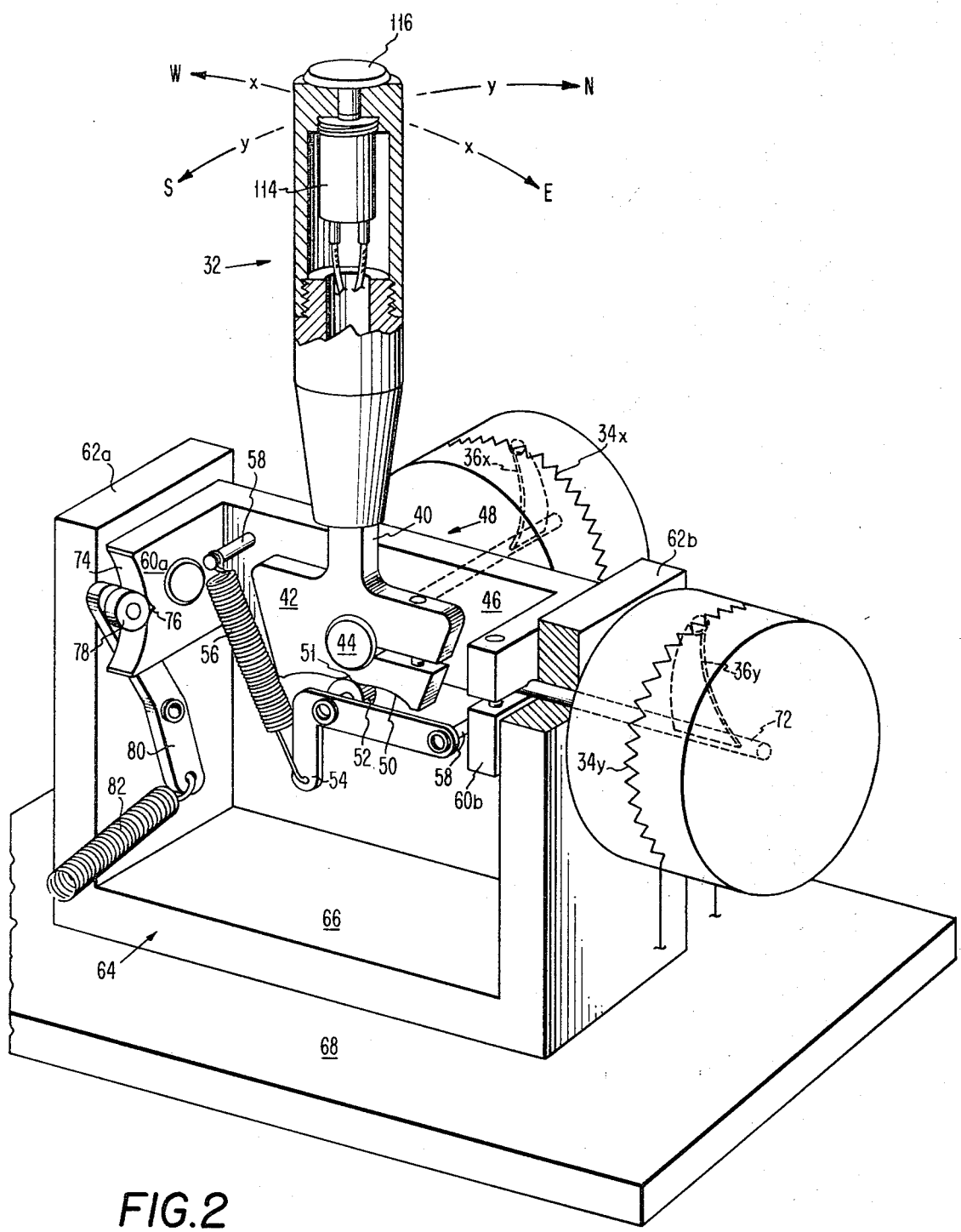
FIG. 2 is a perspective, partly in section, of a manually operable control unit for the contour plotting apparatus represented by FIG. 1.
Figure 3:
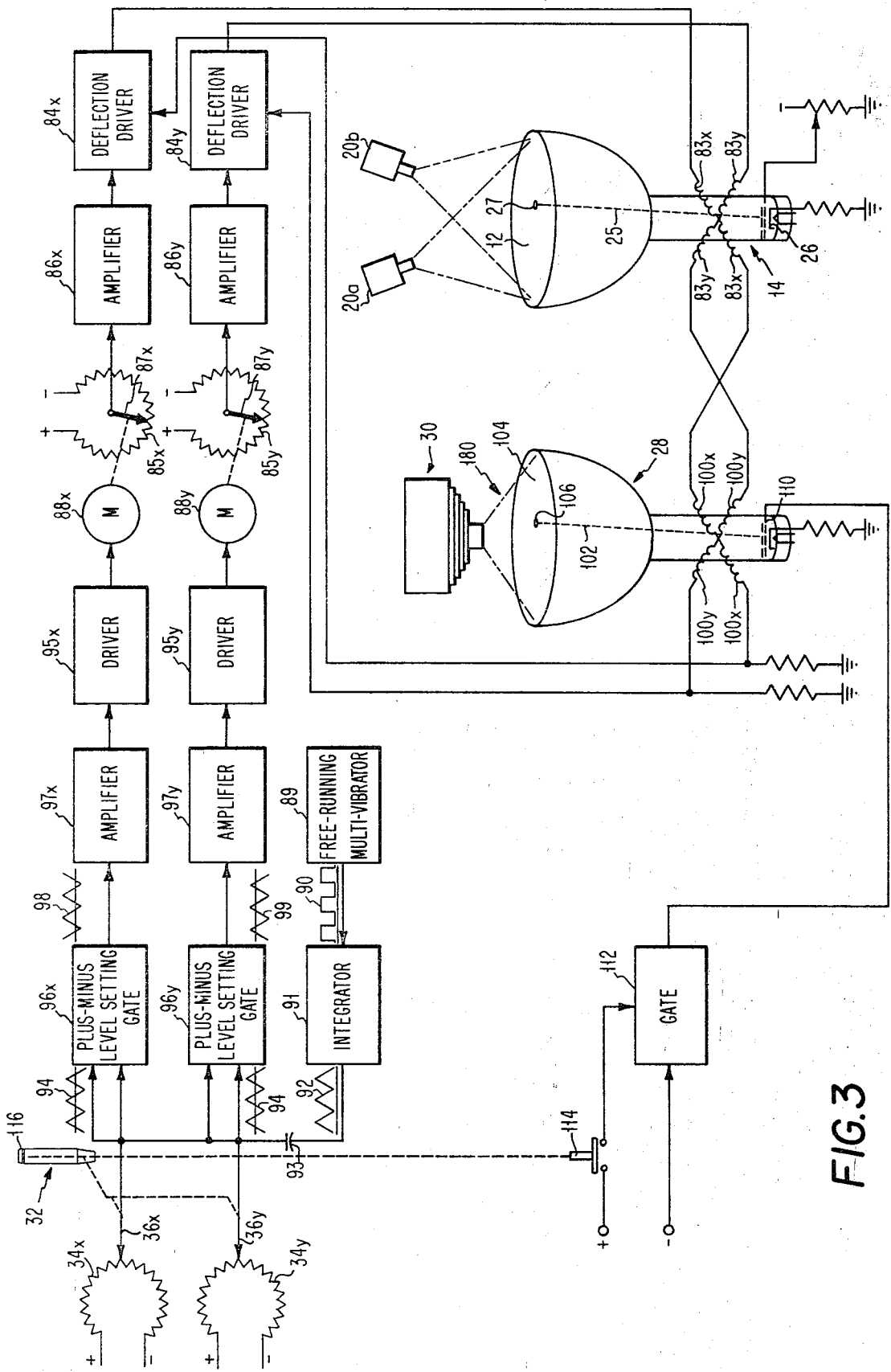
FIG. 3 is a block diagram of the electric circuitry controlled by the device illustrated in FIG. 2.

In accordance with the invention the location of the light points upon the screen of the two tubes may be controlled by manipulation of a control stick 32 similar in mechanical movability to the control columns of airplanes and like vehicles, which are known as "joy sticks." Having reference to FIGS. 2 and 3 the position control device of the invention comprises two potentiometers 34x and 34y arranged to control movement of the light points on the two screens along their abscissae and the ordinates, respectively. With the control column in its central or zero position, the contact arms 36x and 36y of said potentiometers are located at the zero voltage points thereof. Manipulation of the control column 32 is arranged to shift one or both of said control arms in the positive or negative direction to degrees depending upon the direction in which the control column is tilted and the degree to which it is tilted; and the position control device is also arranged to return said arms 36x and 36y to their zero positions as soon as the operator releases the control column.

Having now specific reference to FIG. 2 the control column 32 has the form of a tubular handle that is mounted upon the upwardly directed actuating stem 40 of a centering cam 42. Said cam in turn is clamped firmly upon the operating shaft 44 of the contact arm 36x of potentiometer 34x which shaft is rotatably supported in the cross bar 46 of a U-shaped yoke or bracket 48 that lies normally in a horizontal plane. The edge of cam 42 opposite its stem 40 forms a shallow arcuate recess 50 that has an inwardly receding peak 51 in axial alignment with said stem 40. Said recess is engaged by a cam follower roller 52 which is pivoted to the bight portion of an L-shaped arm 54 that is pivotally supported from the cross bar 46 of bracket 48. A spring 56 tensioned between the free end of said arm 54 and a stud 58 projecting from said cross bar 46, urges the arm 54 in a clockwise direction, as viewed in FIG. 2, and causes the cam follower roller 52 on the bight portion of said arm to seek the deepest point 51 of the recess 50 in the edge of the centering cam 42. Thus, whenever the control column 32 is turned about the axis of the operating shaft 44 of potentiometer 34x, and the edge of the centering cam 42 depresses the roller 52 in the process, said spring 56 is effective as soon as the control column 32 has been released, to return the cam 42 to the position wherein the roller 52 engages the deepest point 51 of the recess 50, which is the position wherein the axis of the control column 32 is vertically disposed and wherein the contact arm 36x of potentiometer 34x is in its zero position.

The legs 60a and 60b of bracket 48 are supported for rotation about a horizontal axis extending at right angles to the axis of shaft 44 from the vertically disposed legs 62a and 62b of another U-shaped yoke or bracket 64 that is slightly larger than the bracket 48 and whose cross bar 66 rests upon and is suitably secured to a horizontal base 68. This base may be the floor of a box or housing 70 (FIG. 1) in which the described control mechanism is encased and from which the control column 32 protrudes. The leg 60b of the first mentioned bracket 48 is firmly clamped to the operating shaft 72 of the contact arm 36y of the second potentiometer 34y. Said shaft 72 extends through, and is rotatably supported in, the leg 62b of the second bracket 64, and said potentiometer 34y and its contact arm 36y are located exteriorly of said bracket leg 62b. Within the legs 62a and 62b of the outer bracket 64 the first mentioned bracket 48 is yieldably held in a "horizontal" position wherein the contact arm 36y secured to the operating shaft 72 of the potentiometer 34y is in its zero position. For this purpose the end edge of leg 60a of said bracket 48 forms a shallow arcuate recess 74 which has a centrally located peak 76 and said recess is engaged by a cam follower roller 78 which is pivoted to one end of a two-armed lever 80 that is rotatably supported from the adjacent leg 62a of the outer bracket 64. A spring 82 tensioned between the opposite end of said lever 80 and a suitable point of the base 68 urges said lever in a clockwise direction as viewed in FIG. 3, and forces the cam follower roller 78 into the arcuate recess 74 in the end edge of bracket leg 60a wherein said roller seeks to find its deepest corner 76; and in response to the force of said roller 78 the bracket 48 assumes normally its "horizontal" position whenever the operator releases the control column 32.

Whenever the operator moves the control column in what may be termed a Northern direction, the contact arm of potentiometer 34y is shifted from its zero position in the positive direction (FIG. 2), and whenever he moves the control column in the Southern direction, the contact arm of said potentiometer 34y is shifted from its zero position in the negative direction. In both instances, the movement of the control column remains without effect upon the contact arm 36x of potentiometer 34x and said contact arm therefore remains in zero position. On the other hand, whenever the operator moves the control column in an Eastern or Western direction, the contact arm 36x of potentiometer 34x is shifted in the negative or positive direction, respectively, while the position of the contact arm 36y of potentiometer 34y remains unaffected. If the control column 32 is tilted in a diagonal direction, however, say for instance in a West-North-West direction, the control arms of both potentiometers are shifted from their zero positions but in different directions and to unequal degrees. Arm 36x of potentiometer 34x is shifted in a negative direction over a relatively large arc while arm 56y of potentiometer 34y is shifted in a positive direction over a substantially smaller arc because the described manipulation of the control column turns the shaft 44 to a substantial degree in a counterclockwise direction from its zero position, but swings bracket 48 only to a minor degree in a clockwise direction from its normal "horizontal" position and therefore imparts only limited rotation in clockwise direction to the control shaft 72 of potentiometer 34y. In accordance with the invention the actuation of the contact arms 36x and 36y of the potentiometers 34x and 34y as effected by tilting the control column 32 is arranged to effect deflections of the electron beam of cathode ray tube 14 in directions parallel to the direction in which the control column is tilted.

The position of the electron beam 25 of the scanning tube is determined by the strength and polarity of currents passed through two sets of series-connected deflection coils 83x and 83y arranged on the neck of said tube. The set of coils 83x is so located that the magnetic fields produced by current flow through said coils deflect the beam in the direction of the abscissa of the phosphor screen 12 of the tube either to the right or the left, or to put it differently, in an Eastern or Western direction, depending upon the direction of the current flow; and the set of coils 83y is located on the neck of the scanning tube along an axis extending transversely to the axis of coils 83x so that the magnetic fields generated by said coils deflect the electron beam 25 along the ordinate of its screen 12 to the North or to the South depending upon the direction of the currents passed through said coils. Current is passed through the sets of deflection coils 83x and 83y by conventional driver stages represented by the blocks 84x and 84y, respectively (FIG. 3). The operation of said driver stages is determined by the size and polarity of the control voltages that are applied to said stages from rotary potentiometers 85x and 85y through operational amplifiers 86x and 86y which are connected to act as adders so that signals composed of A.C., as well as D.C. components, may be delivered to the deflection driver stages. The rotary control arms 87x and 87y of said potentiometers 85x and 85y may be turned at selected speeds in either direction by two-directional motors 88x and 88y, respectively; and the speed and direction of rotation of said motors depends upon the position of the arms 36x and 36y of the potentiometers 34x and 34y which are controlled by manipulation of the hereinbefore described control device 70.

For operating the motors 88x and 88y in a manner dependent upon the position of the arms 36x and 36y of said potentiometers 34x and 34y, a free-running multivibrator represented by the block 89 is arranged to generate square wave pulses of constant amplitude at a constant rate, say 20 pulses per second. In FIG. 3, said pulses are indicated schematically at 90 on the output side of generator 89. Said pulses are passed through an integrator represented by the block 91 wherein they are converted into triangular or saw tooth pulses as schematically indicated at 92. The triangular pulses emerging from integrator 91 are passed through a condenser 93 to remove their D.C. component so that they may be of equal amplitudes relative to the axis of zero current flow in both the positive and negative direction as schematically indicated at 94. The pulses, thus balanced, are simultaneously applied to the driver stages 95x and 95y of the motors 88x and 88y, respectively, through plus-minus level setting gates 96x and 96y and amplifiers 97x and 97y. In said gates 96x and 96y a positive or negative direct current component of predetermined size may be imposed upon the balanced pulses by the potentiometers 34x and 34y depending upon the position of their control arms 36x and 36y, respectively. As long as said control arms are at their zero positions, the pulses pass through the gates 96x and 96y unchanged, i.e., they are of equal amplitude and duration above and below the zero current line and therefore cancel each other out so that they remain without effect upon the drive stages 95x and 95y and as a result thereof the motors remain at rest. When the control arms of the potentiometers 34x and 34y are moved out of their zero positions, however, the pulses are shifted in the positive or negative direction, as the case may be. For instance, when control arm 36x of potentiometer 34x is moved in the positive direction, the pulses are shifted in the positive direction relative to the zero axis, as indicated schematically at 98. Thus, the positive pulse portions applied to the driver stage 95x through amplifier 97x are of greater amplitude and longer duration than the negative pulse portions and as a result thereof, the driver delivers a current to the motor which turns the motor in a predetermined direction, for instance, in a clockwise direction as viewed in FIG. 3, with a speed commensurate with the value of the positive voltage imposed upon the pulses in gate 96x. Vice versa, when the arms of potentiometers 34x and 34y are shifted in the negative direction, a negative D.C. component is imposed upon the pulses 94 as indicated schematically at 99 in FIG. 3. Thus, when arm 36y of potentiometer 34y, for instance, is shifted in the negative direction, a negative voltage balance is applied to the driver stage 95 of motor 88y and said motor turns in the opposite or counterclockwise direction with a speed commensurate with the degree to which the arm 36y of potentiometer 34y has been displaced from its zero position in the negative direction.

Figure 4:
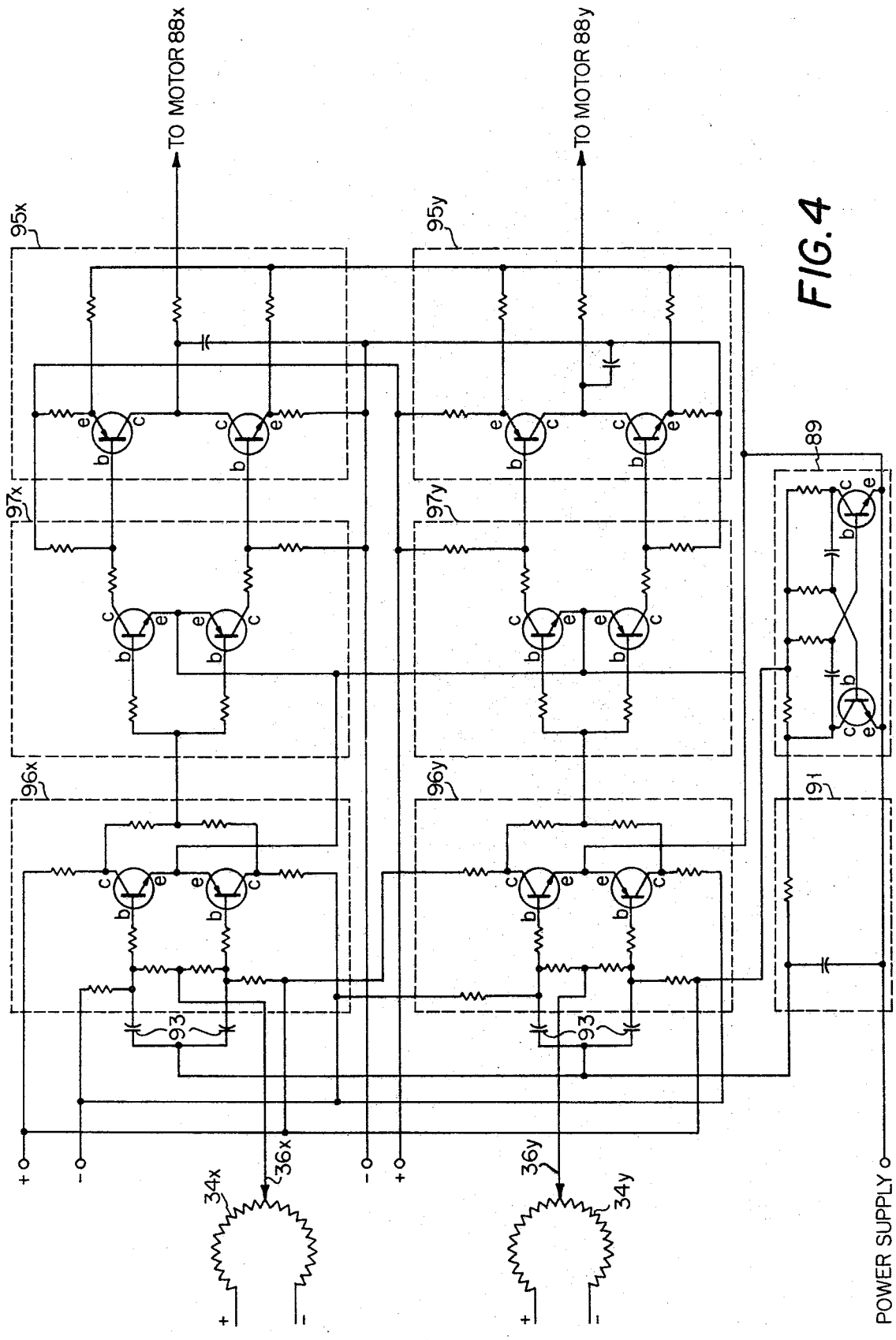
FIG. 4 is an actual circuit diagram of part of the circuitry represented by blocks in FIG. 3.

FIG. 4 illustrates a practical transistorized embodiment of the described arrangement for selectively controlling the direction and speed of operation of the motors 88x and 85y, and to facilitate an understanding of said FIG. 4, the parts thereof corresponding to the blocks of FIG. 3 have been marked out in broken lines and identified by the same reference numerals.

If manipulation of the column 32 moves the contact arm 36x of potentiometer 34x in the positive direction and the motor 88x turns in clockwise direction as viewed in FIG. 3 and swings the contact arm 87x of potentiometer 85x in clockwise direction, increasingly higher positive voltages are applied to the driver stage 84x. Said driver stage in turn delivers a positive current of increasing magnitude to the deflection coils 83x causing a progressive deflection of the electron beam of the scanning tube 14 from its original center position in an Eastern direction along the abscissa of the phosphor screen 12 until the contact arm 87x reaches the positive terminal of the potentiometer 85x. At this moment the light point 27 produced upon the screen of tube 14 by the electric beam 25 reaches its right-most position upon said screen; and as the contact arm 87x negotiates the gap between the positive and the negative terminals of the potentiometer 85x, a high negative voltage is abruptly applied to the driver 84x causing a relatively heavy current to pass through the deflection coils 83x in the opposite direction. As a result thereof, the light point 27 flips from its rightmost position abruptly to its left-most position upon screen 12, and as the arm 87x continues its clockwise rotation, the negative voltage applied to the driver stage 84x decreases and causes a corresponding decrease in the negative current flow through the deflection coils 83x. As a result thereof, the deflection of the light point on screen 12 in a Western direction decreases, and said point returns to its initial central position which it reaches as the arm 87x of potentiometer 85x passes over its zero position whereupon another identical cycle in the deflection of the electron beam 25 commences and will be followed by identical cycles as long as the motor 88x turns the contact arm 87x in a clockwise direction. The extent to which manipulation of the control column 32 moves the contact arm 36x of potentiometer 34x in a positive direction determines the size of the current delivered to the motor 88x by the driver 95x and hence determines the speed with which the motor 88x turns in a clockwise direction. The speed of the motor in turn determines the speed with which the contact arm 87x of potentiometer 85x is turned in a clockwise direction, and hence determines the speed with which the electron beam 25 is deflected in the above described manner.

Analogically, manipulation of the control column 32 to move the contact arm 36x of potentiometer 34x in the negative direction and resultant counterclockwise movement of the motor 88x and contact arm 87x of potentiometer 85x causes the point of light upon the phosphor screen 12 of the scanning tube to traverse the screen cyclically along its abscissa x—x in the opposite direction, i.e., from East to West, for as long as the control column 32 maintains the contact arm 36x of potentiometer 34x in contact with the negative side thereof, with a speed proportionate to the degree to which said contact arm 36x is displaced from its zero position in a negative direction by the tilt of the control column.

Similarly, when manipulation of the control column 32 shifts the contact arm 36y of potentiometer 34y in a positive or negative direction, the motor 88y is set into motion in clockwise or counterclockwise direction with a speed proportionate to the degree to which the contact arm 36y is displaced from its zero position by the tilt of the control column; and the resultant rotation of the contact arm 87y of potentiometer 85y in clockwise or counterclockwise direction, as the case may be, is effective to apply increasingly positive or increasingly negative control voltages to the driver 84y; and as the result thereof said driver will send such cyclically varying currents through the deflection coils 83x as will cause the point of light 27 upon the phosphor screen 12 of the scanning tube to traverse said screen cyclically in a Northern or Southern direction, respectively, with a speed determined by the degree of displacement of arm 36y of potentiometer 34y from its zero position.

In practice, however, an operator will most frequently manipulate the control column 32 in such a manner that it displaces both the contact arms 36x and 36y from their zero positions so that both the motors 88x and 88y commence operation and both sets of deflection coils 83x and 83y generate cyclically varying magnetic deflection fields. If the control column 32 is tilted in the West-North-West direction, for instance, the constant arm 36x of potentiometer 34x is displaced in a negative direction and the contact arm 36y of potentiometer 34y in a positive direction; but the former is displaced to a substantially larger degree than the latter. As a result thereof, motor 88x turns in a counterclockwise direction operating the potentiometer 85x in a manner that is effective to deflect the electron beam in a Western direction and motor 88y turns in a clockwise direction operating its potentiometer 85y in a manner that is effective to deflect the electron beam in a Northern direction, but due to the greater displacement of arm 36x the motor 88x turns twice as fast as motor 88y, and the Western deflection imparted to the electron beam 25 by the deflection coils 98x per time unit has twice the amplitude of the Northern deflection imparted to said electron beam by the deflection coils 98y. The resultant deflection path of the point of light 27 on screen 12 is, therefore, in West-North-Western direction, i.e., the same direction in which the control column 32 is tilted.

As has previously been described, whenever the operator releases the control column 32 upon manipulation, the action of the spring-urged rollers 52 and 78 upon the centering cams 42 and 60a, respectively, is effective to restore the column to its upright position and return the contact arms of both the potentiometers 34x and 34y to their zero positions. With the biasing voltages withdrawn from the level setting gates 96x and 96y, the pulses delivered to the driver stages 95x and 95y of the motors 88x and 88y, respectively, revert to their balanced positions in which they cancel each other out. This renders said driver stages inactive, and with their power cut off, both the motors 88x and 88y come to an immediate halt, and the contact arms 87x and 87y of the control potentiometers 85x and 85y for the drivers 84x and 84y of the deflection coils 83x and 83y, respectively, remain in the particular positions which they had reached at the moment when the operator released the control column. This means that the potentiometers 85x and 85y continue to apply the same voltages to the driver stages 84x and 84y that they applied to said stages when the operator released the control column, and the same deflection currents continue, therefore, to flow through the two sets of deflection coils 83x and 83y. Hence, upon release of the control column, the point of light 27 on screen 12 of the scanning tube 14 retains substantially the location into which it was shifted by the previous manipulation of the control column, and when the operator manipulates the control column again by tilting it into one or the other directions, the point of light will be deflected from its last location upon screen 12 in the direction in which the control column is tilted, in the same manner as described hereinbefore.

Hence, when the operator has established a stereo model upon the screen 12 of tube 14 by turning on the projectors 20a and 20b and viewing the screen from above with the proper spectacles, he may move the light point 27 on the screen 12 of tube 14 into contact with the surface of the stereo model by tilting the control column in the proper direction. This causes the light point to move across the screen in the same direction; and as soon as the light point seems to touch the surface of the stereo model, the operator may release the control column causing it to return the potentiometer arms 36x and 36y to their zero positions while leaving the point of light 27 in its new location seemingly in contact with the surface of the stereo model. The first point of a desired contour has thus been established. The operator may now cause the point of light to follow the desired contour by carefully manipulating the control column to advance said point of light on the screen while maintaining it in contact with the surface of the stereo model; and whenever he feels uncertain as to whether the point of light remains in contact with the stereo model, he may release the control column. This causes return of the column and of the contact arms of potentiometers 34x and 34y to their initial positions, but leaves the light point in the very location to which it was shifted by the previous manipulations of the control column. The operator may now examine the situation at leisure to find out whether the point of light has drifted away from the desired contour, and if so, restore it to a position of contact with the stereo model by renewed manipulation of the control column; and he may then continue to advance the point of light on the screen 12 while keeping it in contact with the surface of the stereo model by appropriately manipulating the control column. Thus, he may trace a desired contour luminously upon the screen of the scanning tube with no more mechanical movement than appropriate manipulation of a control column that may conveniently be located adjacent the screen of the scanning tube 14 (FIG. 1).

To produce a permanent record of the traced contour without requiring manipulation of a stylus or like utensil for drawing the contour on a sheet of paper, the same deflection currents which are applied to the deflection coils 83x and 83y of the scanning tube 14 by manipulation of the control column, are simultaneously applied to corresponding deflection coils 100x and 100y on the neck of the display tube 28 to deflect the electron beam 102 of said tube in synchronism with the electron beam 25 of the scanning tube 14, as has previously been pointed out. For this purpose the deflection coils 100x and 100y of the display tube may simply be connected in series with the deflection coils 83x and 83y, respectively, between said last mentioned deflection coils and ground, as shown in FIG. 3. In this manner the electron beam 102 of the display tube 28 is made to trace luminously upon the screen 104 of said tube the same contour that is established upon screen 12 of plotting tube 14 by manipulation of the control column 32; and as mentioned hereinbefore, a camera 30 placed directly above the screen 104 of the display tube 28 (FIGS. 1 and 3) may be arranged to expose a photo-sensitive sheet 108 to the screen 104 of said tube to make a permanent record of the path of the light point 106 produced on said screen by electron beam 102.

In accordance with the invention the electron beam of the display tube is normally blocked from reaching said screen 104 or at least is held at such an intensity that it is unable to produce luminescence at its point of impingement on said screen, by a suitable blocking potential applied to one of its control grids in a manner well known in the art. To render said point of impingement visible, if desired, a source of negative potential is connected to a control grid 110 of the display tube through a normally closed gate 112 that may be temporarily opened by application of a positive potential to said gate. For applying such an opening potential to the gate 112, a switch 114 which is normally urged into open position by suitable spring means, is located in the tubular interior of the control column 32 (FIG. 2) and may be closed by depression of a push button 116 that projects from the top of said column. Whenever the operator manipulating the control column 32, depresses the push button 116 and closes the switch 114, the positive potential applied to the gate 112 opens said gate. As a result thereof, a strong negative potential is applied to the control grid 110 of the display tube 28. This potential increases the intensity of the electron beam emitted by the cathode of said tube to such an extent that a point of light 106 appears on the screen 104 in the area thereof where the electron beam impinges, and a record of said point is made upon the photosensitive sheet 108 in camera 30.

Thus, whenever the operator manipulates the control column 32 to shift the point of light upon the screen 12 of the scanning tube, the same deflection currents which are applied to the deflection coils 83x and 83y of said scanning tube are simultaneously applied to the reflection coils 100x and 100y of the display tube and will deflect the electron beam of the display tube in synchronism with the electron beam of the scanning tube, but no point of light appears on the screen of the display tube until the operator depresses the push button 116. As soon as he does so, a point of light appears on the screen of the display tube, which corresponds in location and direction of movement to the point of light on the screen of the scanning tube and produces a permanent record of its movement upon the photosensitive sheet in camera 30. As soon as the operator releases the push button 116 on control column 32, however, the negative potential is withdrawn from the control grid 110 of the display tube and the point of light on the screen of said tube disappears. Therefore, by appropriate manipulation of the push button 116 on the control column during the scanning operation, the operator will allow a point of light to appear upon the screen 104 of the display tube 28 only when he is certain that the point of light created upon the screen 12 of the scanning tube 14 is in contact with the surface of the stereo model, and he may immediately cause said point of light 106 to disappear when the light point 26 on the screen of the scanning tube deviates from the surface of the stereo model or when he encounters a situation where he is not sure in which way the desired contour runs. Thus, he is in a position to avoid the recording of incorrect contour points on the photosensitive recording sheet 108 in camera 30.

The described contour plotting arrangement provides a point of light 27 that may be brought into contact with and moved along the surface of a stereo model by merely manipulating a tiltable control stick without moving any mechanical component across the projection base of the stereo model. The arrangement of the invention operates to provide a permanent record of a traced contour without requiring manipulation of a stylus or like drafting element, and it may be made to suspend its contour-recording operation instantaneously whenever an operator is doubtful as to whether the point of light follows the desired contour. By repeating the described contour tracing and recording operations, with the position of the projectors 20a and 20b set to different distances relative to the screen 12 of the scanning tube 12, any desired number of contour lines of a given terrain may be traced by manipulation of the control column 32 and may be recorded in superposition upon the photo-sensitive recording sheet in camera 30 by timely depression of the push button 116 to form a typical contour map of the terrain depicted in the stereoscopically related diapositives.

While we have explained our invention with the aid of a particular embodiment thereof, it will be understood that the invention is not limited to the specific constructional details and circuit arrangements shown and described by way of example, which may be departed from without departing from the spirit and scope of our invention.

We claim:

1. A contour plotting apparatus comprising a first cathode ray tube having a phosphor screen and means including an electron beam emitting electrode for producing a point of light upon said screen, means for producing a stereo model upon said screen, a second cathode ray tube having a phosphor screen and means including an electron beam emitting electrode for producing a point of light upon said last mentioned screen, and means for recording points of light appearing upon said last mentioned screen, and manually operable means including a tiltable control column for deflecting the electron beams of said cathode ray tubes in synchronism in predetermined directions.

2. A contour plotting apparatus comprising a first cathode ray tube having a first phosphor screen and means including an electron beam emitting electrode for producing a point of light upon said first screen, means for producing a stereo model upon said first screen, a second cathode ray tube having a second phosphor screen and means including an electron beam emitting electrode for producing a point of light upon said second screen, means for recording points of light appearing upon said second screen, and manually operable means including a universally tiltable control column for deflecting the electron beams of said cathode ray tubes in synchronism in directions corresponding to the directions of tilt of said control column.

3. A contour plotting apparatus comprising a first cathode ray tube having a first phosphor screen and means including an electron beam emitting electrode for producing a point of light upon said first screen, means for producing a stereo model upon said first screen, a second cathode ray tube having a second phosphor screen and means including an electron beam emitting electrode for producing a point of light upon said second screen, means for recording points of light appearing upon said second screen, manually operable means including a universally tiltable control column for deflecting the electron beams of said cathode ray tubes in synchronism in directions corresponding to the directions of tilt of said control column, and means operative upon release of said control column for restoring said control column to said initial position thereof without affecting the present position of the electron beams of said cathode ray tubes.

4. A contour plotting apparatus comprising a first cathode ray tube having a first phosphor screen and means including an electron beam emitting electrode for producing a point of light upon said first screen, means for producing a stereo model upon said first screen, a second cathode ray tube having a second phosphor screen and normally disabled means including an electron beam emitting electrode for producing a point of light upon said second screen, means for recording points of light appearing upon said second screen, manually operable means including a tiltable control column for deflecting the electron beams of said cathode ray tubes in synchronism and manually operable means on said control column for rendering said normally disabled light point producing means of said second cathode ray tube effective.

5. A contour plotting apparatus comprising a first cathode ray tube having a first phosphor screen and means including an electron beam emitting electrode for producing a point of light upon said first screen, means for producing a stereo model upon said first screen, a second cathode ray tube having a second phosphor screen and normally disabled means including an electron beam emitting electrode for producing a point of light upon said second screen, means for recording points of light appearing upon said second screen manually operable means including a control column universally tiltable from an initial position for deflecting the electron beams of said cathode ray tubes in synchronism in directions corresponding to the directions of tilt of said control column, and means operative upon release of said control column for restoring said control column to said initial position thereof without affecting the present position of the electron beams of said cathode ray tubes, and manually operable means on said control column for rendering said normally disabled light point producing means of said second cathode ray tube effective.

6. Arrangement for controlling the position of the electron beam of a cathode ray tube comprising a deflection element associated with said tube, means having a rotary control member for controlling the operation of said deflection element, a normally idle motor connected to said rotary control member for turning said control member, means for energizing said motor having a control arm normally set to a zero position, manually operable control means connected to said control arm for setting said control arm to drive said motor at speeds determined by the degree of displacement of said control arm from its zero position, and means operative upon release of said manually operable control means for returning said control arm to its zero position to terminate operation of said motor.

7. Arrangement for controlling the position of the electron beam of a cathode ray tube comprising a deflection element associated with said tube, means having a rotary control member for controlling the operation of said deflection element, a normally idle two-directional motor connected to said control member for turning said control member, means for controlling the direction and speed of rotation of said motor having a control arm normally set to a zero position, control means connected to said control arm and selectively operable manually to set said control arm to predetermined positions in positive and negative directions for driving said motor selectively in either of its two directions at speeds determined by the degree of displacement of said control arm from its zero position, and means operative upon release of said control means for returning said control arm to its zero position to thus terminate operation of said motor, while leaving said control member in its present position to maintain the present state of deflection of the electron beam.

8. Arrangement for controlling the position of the electron beam of a cathode ray tube comprising a set of deflection coils upon the neck of said tube, a driver stage for directing current flow through said set of coils, a potentiometer having a rotary contact arm for controlling the operation of said driver stage to determine the magnitude and polarity of the current directed through said set of coils, a normally idle two-directional motor connected to said contact arm for turning said contact arm, a variable resistance for controlling the direction and speed of said motor having a control arm normally set to a zero position, control means connected to said control arm and selectively operable manually to set said control arm to predetermined positions in positive and negative directions for driving said motor selectively in either of its two directions at speeds determined by the degree of displacement of said control arm from its zero position, and means operative upon release of said manually operable control means for returning said control arm to its zero position to thus terminate operation of said motor, while leaving said potentiometer in its present position of adjustment to maintain the present state of deflection of the electron beam.

9. Arrangement for deflecting the electron beam of a cathode ray tube in any desired direction comprising deflection elements associated with said tube along axes disposed at right angles to each other, means having rotary control members for controlling the operation of said deflection elements, normally idle motors connected to said control members for turning said control members, means for energizing said motors having control arms normally set to zero positions, and manually operable control means connected to said control arms for setting said control arms simultaneously to predetermined positions to drive said motors at speeds determined by the individual degrees of displacement of said control arms from their zero positions.

10. Arrangement for setting the electron beam of a cathode ray tube to any desired point of its screen comprising a pair of deflection elements associated with said tube along axes disposed at right angles to each other, means having rotary control members for controlling the operation of said deflection elements, normally idle motors connected to said control members for turning said control members, means for energizing said motors having control arms normally set to zero positions, manually operable control means connected to said control arms for setting said control arms simultaneously to predetermined positions to drive said motors with speeds determined by the degree of displacement of said control arms from their zero positions, and means operative upon release of said manually operable control means for returning said control arms to their zero positions to terminate operation of said motors.

11. Arrangement for setting the electron beam of a cathode ray tube to any desired point of its screen comprising two sets of deflection coils arranged upon the neck of said tube along axes disposed at right angles to each other, driver stages for directing current flow through said set of coils, potentiometers having rotary contact arms for controlling said driver stages to determine the magnitude and polarity of the currents directed through said sets of coils, normally idle two-directional motors for turning the contact arms of said potentiometers, variable resistances arranged in planes extending at right angles to each other for controlling the operation of said motors and having control arms normally set to zero positions, control means selectively operable manually for setting said control arms simultaneously selectively to predetermined positions in positive and negative directions for driving said motors selectively in either of their two directions with speeds determined by the degrees of displacement of said control arms from their zero positions, and means operative upon release of said manually operable control means for returning said control arms to their zero positions to thus terminate operation of said motors, while leaving said potentiometers in their present positions of adjustment to maintain the present state of deflection of the electron beam.

12. Arrangement for controlling the deflection of the electron beam of a cathode ray tube comprising a deflection element, means for controlling the operation of said deflection element including a rotary control member, a motor for turning said control member, and means for selectively turning said motor in either direction at predetermined speeds including means for generating pulses, gate means for selectively imposing positive and negative direct current components of predetermined magnitude upon said pulses, and means for controlling the power supply to said motor with the pulses emerging from said gate means.

13. Arrangement for controlling the deflection of the electron beam of a cathode ray tube along a predetermined axis comprising a deflection element; means for controlling the operation of said deflection element including a rotary control arm; a motor for turning said control arm having a power circuit; and means for selectively turning said motor in either direction at predetermined speeds including a square wave pulse generator, integrator means for converting the pulses produced by said generator into triangular pulses, condenser means for balancing said triangular pulses with respect to an axis of no current flow, gate means including a manually operable potentiometer for selectively imposing positive and negative direct current components of predetermined magnitude upon said balanced pulses to shift them selectively in positive and negative directions to desired degrees, and means for controlling the power circuit of said motor with the pulses emerging from said gate means.

References Cited
UNITED STATES PATENTS

| | | | |
|---|---|---|---|
| 2,929,258 | 3/1960 | MacKway | 74—471 |
| 2,939,332 | 6/1960 | Peterson | 74—471 |
| 2,945,414 | 7/1960 | Blackstone | 74—471 |
| 3,214,514 | 10/1965 | Schmid | 178—6 |
| 2,306,862 | 12/1942 | Bown | 178—6.8 |
| 2,748,272 | 5/1956 | Schrock | 328—181 |
| 3,087,986 | 4/1963 | De Brosse | 178—6.8 |
| 3,260,912 | 7/1968 | Gregory | 318—341 |

RICHARD MURRAY, Primary Examiner

J. A. ORSINO, JR., Assistant Examiner

U.S. Cl. X.R.

74—471; 178—6.7; 315—19; 318—341, 342; 328—181